Sept. 30, 1969          H. KLAPP          3,469,508

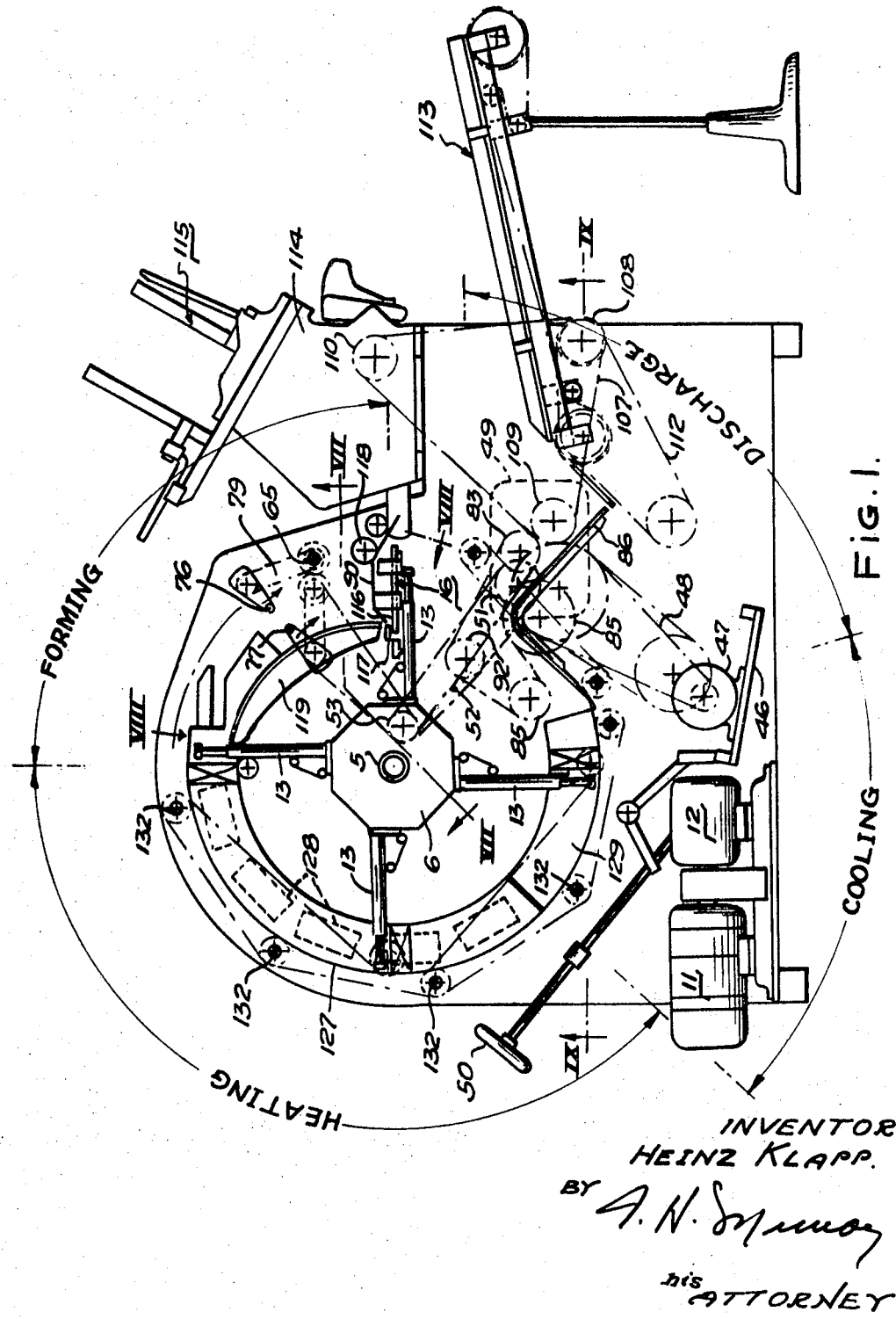

APPARATUS FOR FORMING GLUED OR COATED FOLDING BOX STOCK

Filed April 5, 1967          8 Sheets-Sheet 2

INVENTOR
HEINZ KLAPP
BY
his ATTORNEY

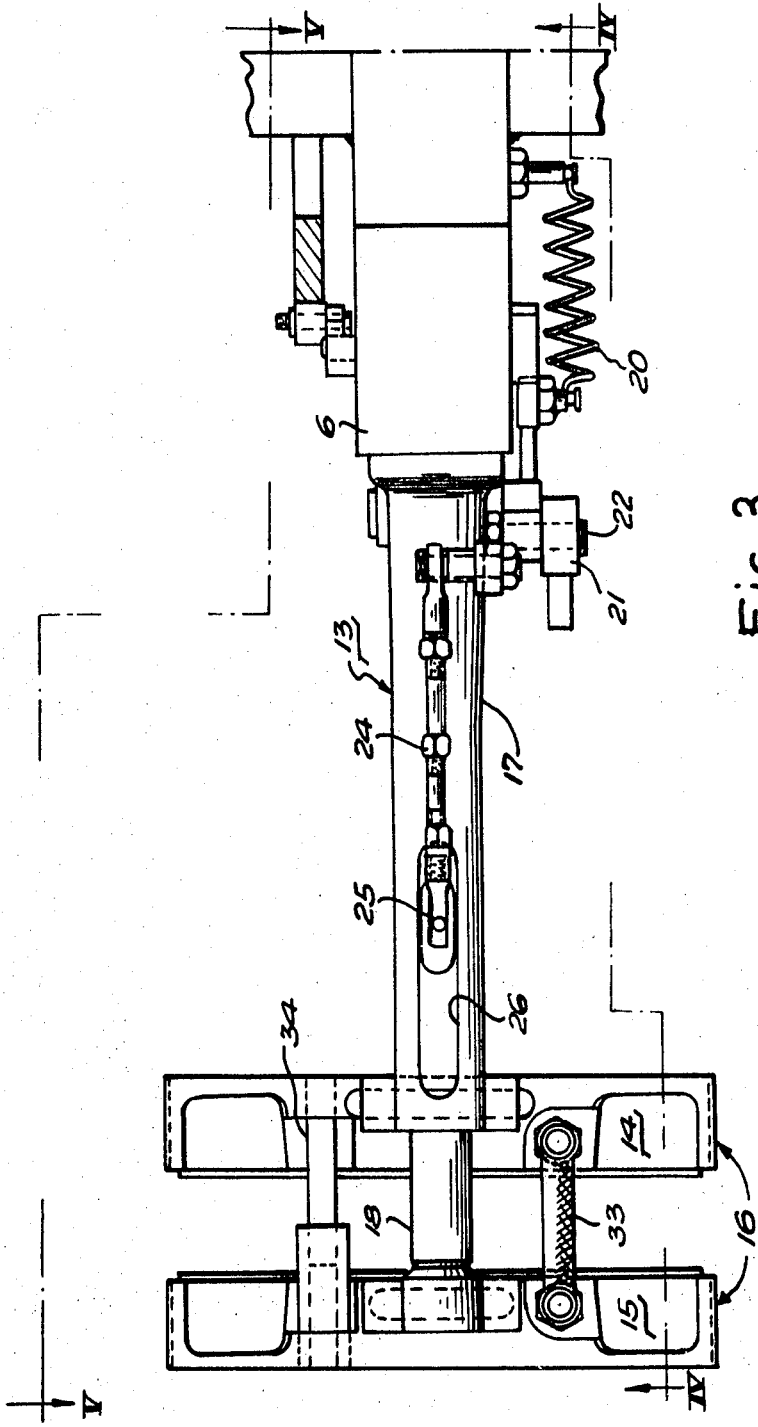

Sept. 30, 1969          H. KLAPP          3,469,508
APPARATUS FOR FORMING GLUED OR COATED FOLDING BOX STOCK
Filed April 5, 1967          8 Sheets-Sheet 4
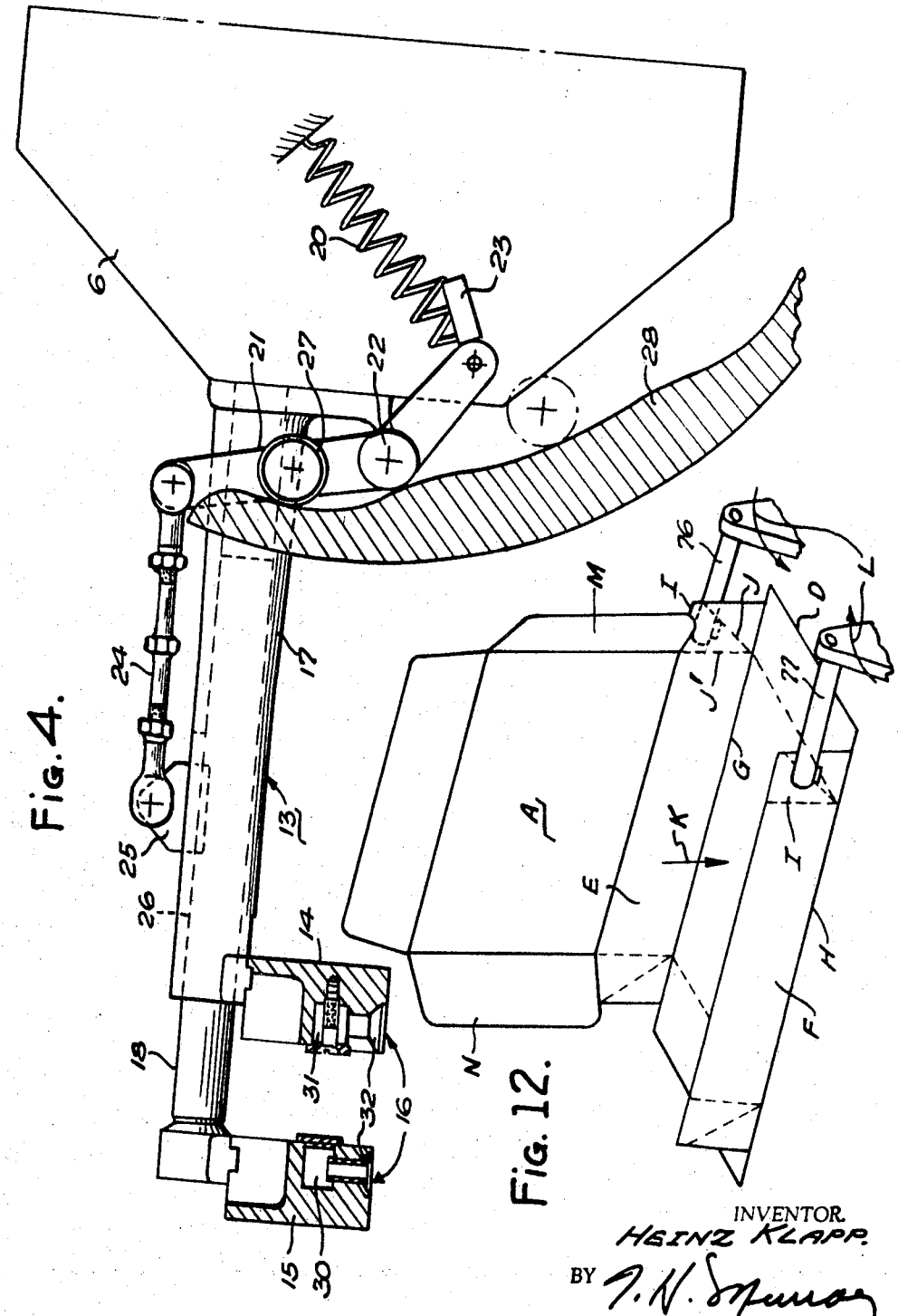
INVENTOR.
HEINZ KLAPP.
BY
his ATTORNEY

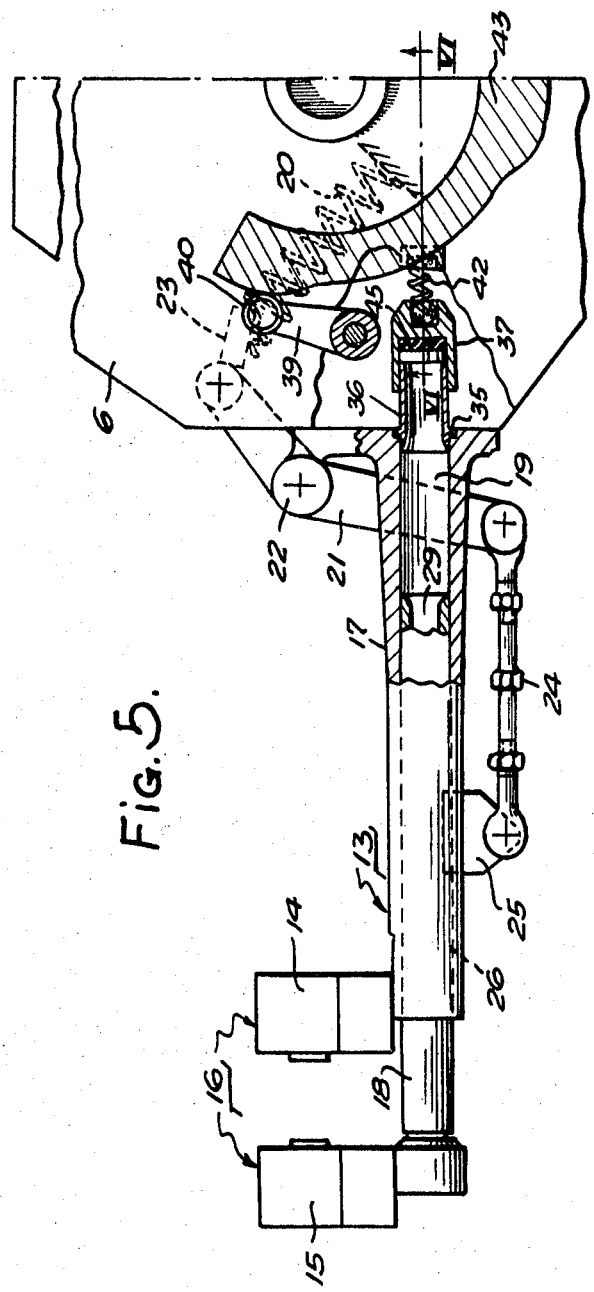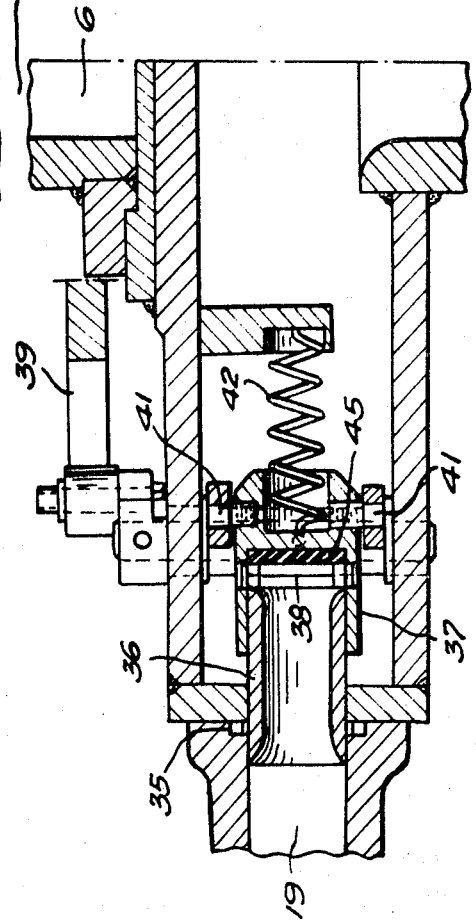

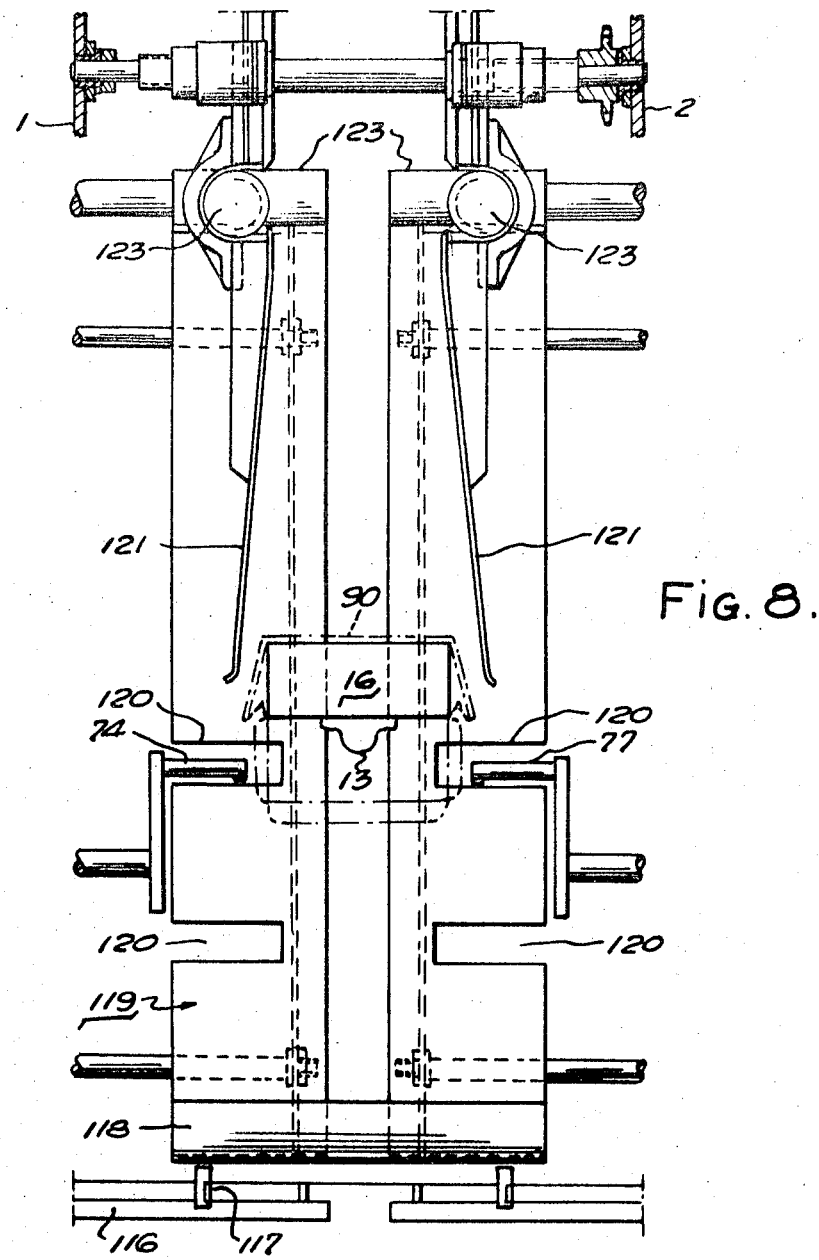

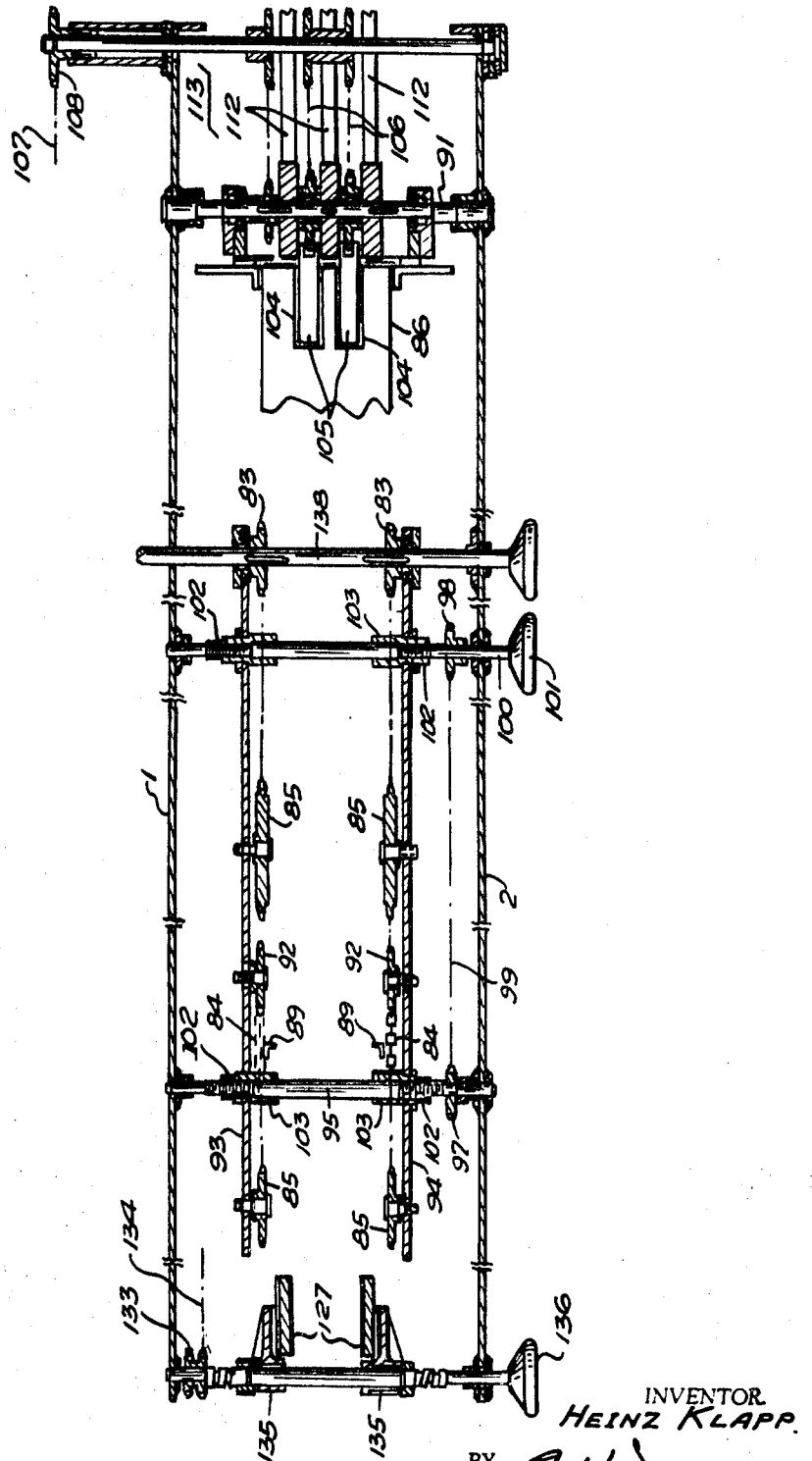

United States Patent Office 3,469,508
Patented Sept. 30, 1969

3,469,508
APPARATUS FOR FORMING GLUED OR COATED FOLDING BOX STOCK
Heinz Klapp, Schwelm, Germany, assignor to Gebr. Eickhoff, Maschinenfabrik und Eisengiesserei m.b.H., Bochum, Germany, a corporation of Germany
Filed Apr. 5, 1967, Ser. No. 628,715
Claims priority, application Germany, Apr. 9, 1966, E 31,436
Int. Cl. B31b 1/02, 1/26
U.S. Cl. 93—44.1      7 Claims

ABSTRACT OF THE DISCLOSURE

Apparatus is described for forming pre-glued or coated box stock into rectangular boxes by means of a plurality of forming blocks, all rotatable about a central axis, which force the stock between folding fingers and then between parallel guideways at spaced points in the circular path of travel of the forming blocks to thereby form the box. After forming, the boxes pass through a heating zone which cures the glue, a cooling zone and then to a discharge conveyor, all within the circumferential path of travel of the forming blocks.

BACKGROUND OF THE INVENTION

In the past, devices have been used for forming pre-glued box stock wherein top and bottom dies are mounted on a continuous, constantly rotating conveyor. In such devices, the four side walls of pre-glued box stock are formed between top and bottom dies in a single operation; and the box walls are heat sealed by the use of a high frequency generator which produces high frequency fields between the top die part located in the box and the bottom die part enclosing the box. A device of this type permits rotation of both the top dies, as well as the bottom dies, on continuous conveyor elements whereby each top die actually presses the box stock into a cooperating one of the bottom forming dies. This arrangement, however, requires a large number of top dies and bottom dies which are used in only a relatively small arc of their circular path of travel and must be transported over the remaining circular arc or distance. A device of this type, therefore, requires a relatively large space and, more importantly, is expensive to install.

SUMMARY OF THE INVENTION

As an overall object, the present invention provides apparatus for forming the four side walls of a box without the necessity for a plurality of sets of top and bottom dies.

More specifically, an object of the invention is to provide a device for forming a box in a rotational path of travel by forcing the box, mounted on a moving forming block, between stationary forming guideways.

In accordance with the invention, there is provided a plurality of forming blocks, mounted on radially-extending arms which can be rotated in a circular path of travel around a central axis. At one point around the axis of rotation is an arcuate channel which forms the box stock, and beyond the arcuate channel is a heating zone which seals the ends of the boxes. From the heating zone, the formed box is passed to a cooling zone and thence to a discharge conveyor. Thus, as each forming block passes around its circular path of travel, it passes first through a forming zone, then through a heating zone, and finally through a cooling zone to a dicharge zone.

The box stock which is introduced into the circular path of the forming blocks between the forming zone and the discharge zone is seized by one of the aforesaid forming blocks. As will be seen, the forming blocks have suction ports on their faces which engage the box stock as it is introduced into the path of the forming blocks. The suction ports are connected to a vacuum pump through conduits formed in the radially-extending arms on which they are carrid. A vacuum is created within the suction cups so as to hold the box stock in engagement with the forming blocks as they pass through the forming and heating zones. However, when the forming blocks pass into the discharge zone, the suction cups are connected with the atmosphere such that the formed blocks may be easily discharged therefrom.

According to another feature of the invention, the aforesaid forming blocks are in two parts and spaced radially with respect to each other on the radial arm on which they are carried, whereby the outer part of each forming block can be moved in or out with respect to the other and is positioned at a preselected distance from the other forming block part. The outer part of the forming block and the section of the arm on which it is carried are spring loaded radially outwardly such that they may be moved radially inwardly at the discharge zone by means of a cam to, therefore, withdraw it from the inside wall of the formed box and, thus, make it easier at the discharge zone to remove the box which, by this time, is completely formed.

In the forming zone of the apparatus, the front and back of the box are initially formed or bent upwardly from a flat piece of box stock. This is accomplished by causing the box stock, held on the aforesaid forming block parts, to pass between pairs of rotating folding fingers. The folding fingers rotate about axes extending parallel to the axis of rotation of the forming blocks and are located in pairs on opposite sides of the forming blocks passing through the forming zone. The folding fingers rotate in a direction counter to the direction of travel of the forming blocks laterally against the folded front and back faces of the stock and press the fold triangles at the edges of the stock inwardly. Thereafter, the stock passes between the opposite side faces or walls of a channel to complete the formation of the box. After the box is formed, it passes through the aforesaid heating zone and thence to the discharge zone.

DESCRIPTION OF THE DRAWINGS

The above and other objects and features of the invention will become apparent from the following detailed description taken in connection with the accompanying drawings which form a part of this specification, and in which:

FIGURE 1 is an elevational side view of the apparatus of the invention;

FIG. 3 is a top view of one of the radially-extending arms of the apparatus which carries the box forming blocks of the invention;

FIG. 4 is a side view of the arm of FIG. 3 taken substantially along line IV—IV of FIG. 3;

FIG. 5 is a side view of the arm of FIG. 3 taken substantially along line V—V of FIG. 3;

FIG. 6 is a cross-sectional view taken substantially along line VI—VI of FIG. 5;

FIG. 8 is a view taken substantially along line VIII—VIII of FIG. 1 and illustrating the box forming section of the apparatus;

FIG. 9 is a view taken substantially along line IX–IX of FIG. 1;

FIG. 12 illustrates the operation of the folding fingers shown in FIG. 7.

DESCRIPTION OF THE PREFERRED EMBODIMENTS

Figure 10:
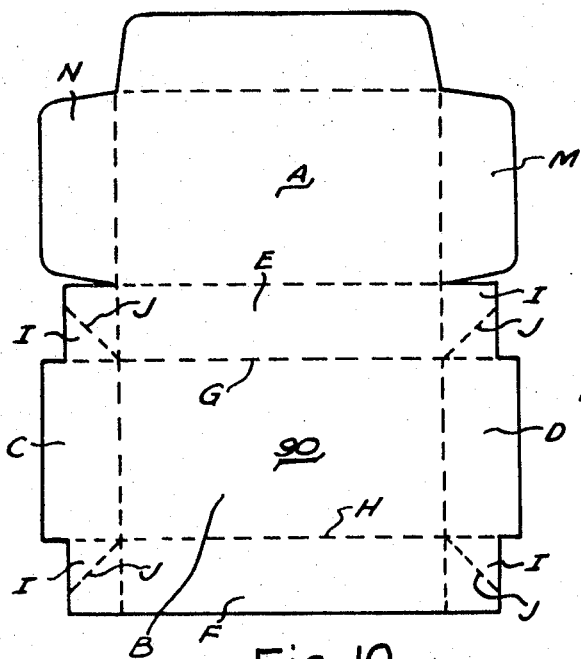
FIG. 10 is a view of the flat box stock before it is formed into a completed box.
Figure 11:
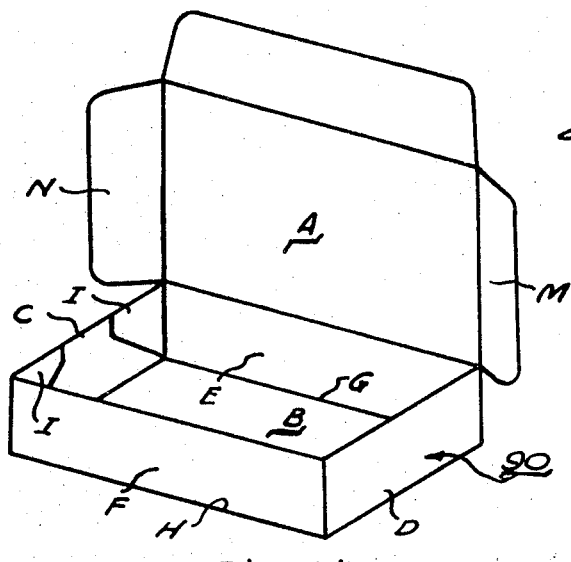
FIG. 11 is an isometric view of the completed box after forming.

With reference now to the drawings, and particularly to FIGS. 10 and 11, flat box stock 90 is shown and comprises an upper lid portion A, a lower bottom portion B, end wall portions C and D, and back and front wall portions E and F. The flat stock is formed so as to be easily bent at the broken line sections shown in FIG. 10; and in the formation of the box the front and rear wall portions E and F are initially bent along lines G and H to form the approximate box section shown, for example, in FIG. 12. Thereafter, folding fingers, hereinafter described in detail, engage fold triangle portions I whereby each triangle portion is folded along line J to force the end wall portions C and D upwardly. Thereafter, the triangular portions I, which are pre-glued, are pressed against the end wall sections C and D as shown in FIG. 11 and heat sealed to produce the completed box.

Figure 7:
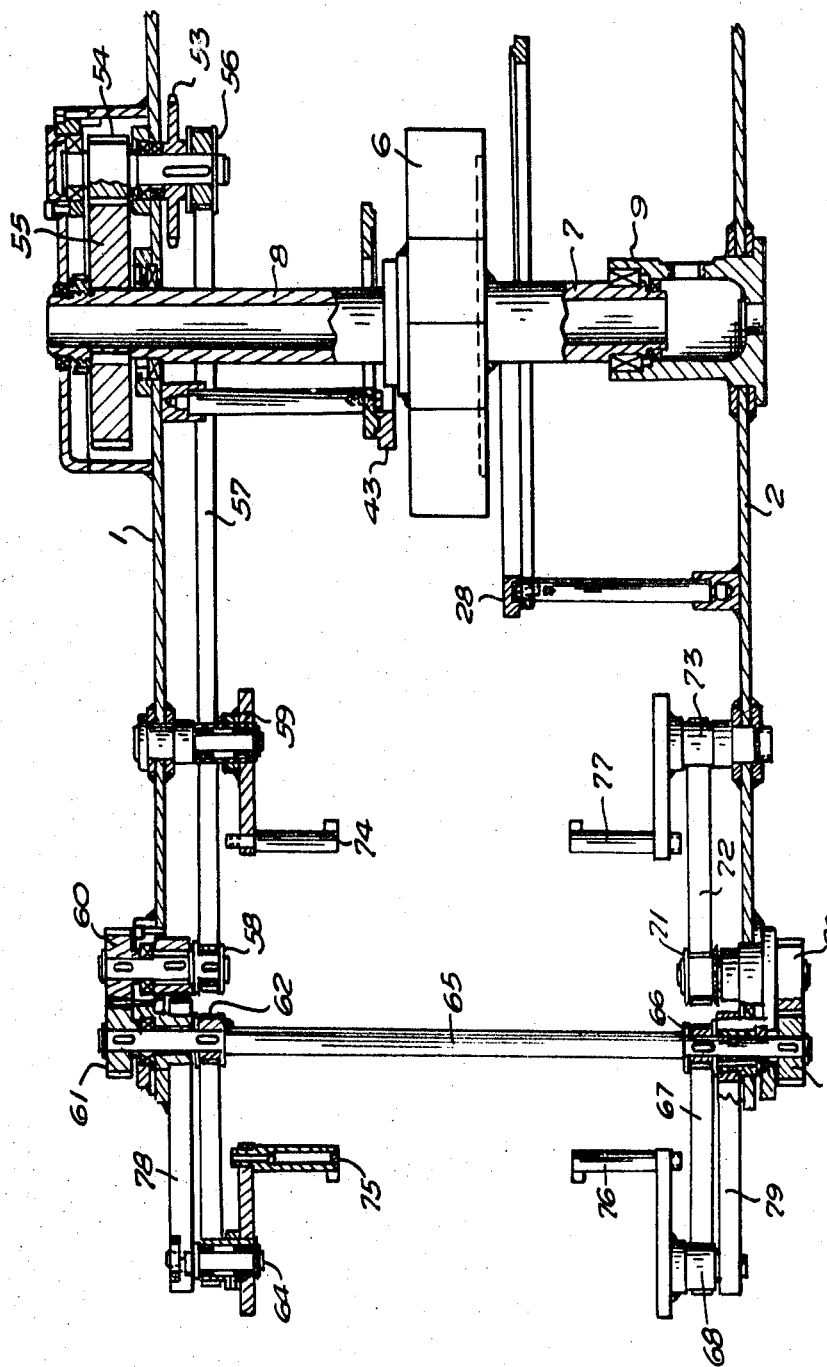
FIG. 7 is a sectional view taken substantially along line VII—VII of FIG. 1 and illustrating the operation of the folding fingers of the invention.

With reference now to FIG. 1, the apparatus shown includes a rotatable central shaft 5 which is supported on two side walls 1 and 2, perhaps best shown in FIGS. 7 and 9. The shaft 5 consists of two sections 7 and 8 (FIG. 7) which are rigidly interconnected by means of a hollow boss 6. Of the two sections 7 and 8, only the hollow interior of the shaft section 7 is connected with the interior of the boss 6. The shaft section 7, whose end enters a bushing 9 which is closed at one side and which is located in the side wall 2 of the device, connects the interior of the boss 6 with a vacuum pump 12 as shown in FIG. 1 by suitable conduit means, not shown. The vacuum pump 12 is driven by means of a suitable motor 11. Thus, the interior of the boss 6 is continually maintained at a pressure below atmospheric pressure. The boss 6, which is in the shape of a polygon has, at its periphery, four uniformly distributed arms 13 (FIG. 1) which bear at each of their outer ends a forming block 16 (FIGS. 3, 4 and 5) consisting of two sections 14 and 15.

As each of the arms 13 rotates with its associated forming block 16, it passes first through an arcuate forming section, then through an arcuate heating section, thence through an arcuate cooling section, and finally to a discharge section, these sections being indicated on FIG. 1 by appropriate legends. In the forming section, the box stock 90 of FIG. 10, for example, is initially formed into the box of FIG. 11. Thereafter, the formed box section is passed through the heating zone in order to heat seal the end portions C and D to the folded triangle portions I. Therafter, the box is passed through the cooling zone and thence to an exit conveyor in the discharge zone, generally indicated by the reference numeral 113 (FIG. 1).

With reference now to FIGS. 3, 4 and 5, the detail of the rotatable arms 13 is shown. As was mentioned above, the forming block 16 is formed in two sections 14 and 15. The inner section 14 is carried by a hollow tubular section 17 of the arm 13, which hollow section is mounted on the rotatable boss 6. The outermost section 15 of the forming block 16, on the other hand, is carried by a tubular section 18 which fits into the section 17 so as to telescope therewith.

Connected to the inner telescoping tubular section 18 of each arm 13 (FIGS. 3, 4 and 5) is a clevis or eyelet 25 which extends through a slot 26 in the inner tubular member 17. Pivotally connected to the clevis 25 is a rod 24 having its opposite end connected to a two-armed lever 21 which is pivotally mounted on the boss 6 as at 22. The lever 21 is urged to rotate in a counterclockwise direction (FIG. 4) about the pivot point 22 by the spring 20 and is normally held in engagement with a stop 23 on the side of the boss 6. Carried on one of the arms of the lever 21 is a cam follower wheel 27 (FIG. 4) which rides on arcuate cam 28. The rod 24 is adjustable in length whereby the normal spacing between the forming block sections 14 and 15 may be adjusted. As will be seen, the roller 27 engages the arcuate cam 28 (see also FIG. 7) at the discharge section of the device shown in FIG. 1 to thereby draw the outer forming block section 15 radially inwardly, thereby permitting the formed box stock 90 to be discharged from the forming block sections 14 and 15 and onto the discharge conveyor 113 shown in FIG. 1.

The forming block sections 14 and 15 as viewed in FIG. 4 are formed with suction cups 32 adapted to engage the bottom B (FIG. 10) of the box stock 90. Above each of the suction cups 32 is a chamber 30 or 31, the two chambers being interconnected by means of a flexible hose 33 (FIG. 3). Chamber 30 is connected by suitable means, not shown, to the interior of the hollow tubular section 18 which, as will be seen, is adapted for connection to the interior of the boss 6. Thus, when the interior of section 18 is connected to the interior of boss 6, a vacuum will be created in chamber 30; and, since the two chambers 30 and 31 are interconnected by flexible hose 33, a vacuum will also be created in chamber 31.

As shown in FIG. 3, a guide rod 34 comprising a cylindrical portion and a rod which telescopes into the cylindrical portion prevent relative rotation of the two forming block sections 14 and 15.

With reference, now, to FIGS. 5 and 6, it can be seen that the inner end of the outer tubular section 18 which carriers forming block portion 15 is provided with a flared inner end 29. End 29, in turn, communicates with a chamber 19 formed in the tubular section 17 of arm 13. At the radially innermost end of the chamber 19 is a valve assembly including a bushing 36 having an end which projects into the chamber 19. The bushing 36 is held in place by means of a flange 35 which fits into a cooperating slot or annular groove in the section 17 of arm 13.

Reciprocably mounted on the outer periphery of the bushing 36 is a sleeve 37 having one or more slots 38 formed in its periphery. Under normal circumstances, the sleeve 37 will be held in the position shown by means of a tension spring 42 whereby the interior of the boss 6, at a pressure below atmospheric pressure, is connected through the ports or openings 38 and bushing 36 to chamber 19 and, hence, the suction cups 32 in forming block sections 14 and 15. When however, the sleeve 37 is forced radially outwardly against the force of spring 42, the openings or slots 38 will slide over the outer surface of the bushing 36, and the radially innermost end of the bushing will seat against the valve seat 45, thereby disconnecting the suction cups 32 of FIG. 4 from the vacuum pump 12 of FIG. 1 and enabling the box stock 90 of FIG. 4 to drop from the forming block sections 14 and 15. The formed box should drop from the forming block sections 14 and 15 in the discharge area of the device as shown in FIG. 1. Accordingly, as shown in FIGS. 5 and 6, a second arcuate cam 43 is provided in the discharge area on the side of the boss 6 opposite the cam 28 of FIG. 4. The cam 43, in turn, engages a cam follower roller 40 on a two-armed lever 39 which is pivotally mounted on the boss 6. Carried at the lower end of the two arms of the lever 39 are rollers or pins 41 (FIG. 6) mounted in openings in the sleeve 37. With this arrangement, when the follower 40 engages the arcuate cam 43, the sleeve 37 will be forced radially outwardly, thereby closing the ports or openings 38 to disconnect the interior of the boss from the suction cups 32. The linkage between the individual arm and its associated forming block sections 14 and 15 then rapidly leads to an equalization of pressure between the atmosphere and the interior of the suction cups 32 such that the formed box may be discharged from the forming block sections. Thus, at the discharge section of the device shown in FIG. 1, section 15 on arm portion 18 moves inwardly and, at substantially the same time, the pressure is equalized on opposite sides of the suction cups 32 such that the formed box section may be discharged.

Figure 2:
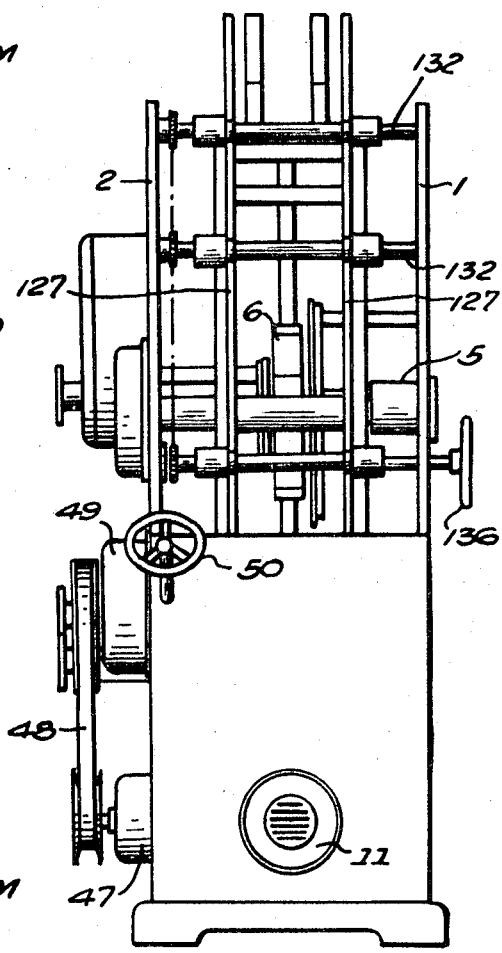
FIG. 2 is a front elevational view of the apparatus of FIG. 1 as viewed from the left.

With reference again to FIGS. 1 and 2, there is provided a variable speed transmission 47 mounted on a rotatable platform 46. Interconnecting the transmission 47 and reduction gearing 49 (FIG. 2) is a chain belt 48 or the like. The slope of the platform 46 on which the transmission 47 is carried will vary the speed of the gear reduction mechanism 49. The slope of the platform 46 can, in turn, be varied by turning handwheel 50 shown in both FIGS. 1 and 2. By power take-off 51 (FIG. 1) connected to reduction gearing 49, rotary motion is imparted to sprocket wheel 53 (FIGS. 1 and 7) by means of a chain belt 52. The sprocket 53, in turn, is connected to a pinion gear 54 (FIG. 7) which meshes with a spur gear 55 connected to the shaft 5 on which the boss 6 and arms 13 are carried.

With specific reference, now, to FIG. 7, the sprocket 53 is on a common shaft with a pulley 56. The pulley 56, in turn, is connected through a belt 57 to pulley 58 which drives gear 60. The gear 60, in turn, is meshed with a second gear 61 carried on shaft 65 extending between the side walls 1 and 2 (see also FIG. 1). Mounted on the shaft 65 is a pulley 62 which is connected to a pulley on shaft 64. The latter pulley, in turn, rotates an arm on which is carried a folding finger 75.

It will be noted that the drive belt 57 passes over a pulley 59. With this arrangement, and upon rotation of the sprocket 53, for example, the pulley 59 will rotate in one direction while, because of the spur gears 60 and 61, the pulley 64 and folding finger 75 will rotate in the opposite direction. Carried on the pulley 59 is an arm which, in turn, carries a second folding finger 74. The function and operation of the folding fingers 74 and 75 will be described hereinafter.

At the end of shaft 65 opposite the pulley 62 is a pulley 66 connected through drive belt 67 to pulley 68. Pulley 68, in turn, drives an arm which carries a folding finger 76 on the other side of the apparatus. Likewise, the end of shaft 65 is connected through gears 69 and 70 to pulley 71. The pulley 71 is connected through belt 72 to pulley 73 which, in turn, drives an arm which carries a fourth folding finger 77.

With the arrangement just described, the folding fingers 74 and 77 will rotate in the same direction. Similarly, the folding fingers 75 and 76 will also rotate in the same direction which is opposite to the direction of rotation of fingers 74 and 77. The direction of rotation of the folding fingers is opposite to that of the forming blocks 16. Thus, with the direction of rotation of the arms 13 counterclockwise in FIG. 1, the direction of rotation of the folding fingers 77 and 76, for example, will be in the direction of the diagrammatic arrows of FIG. 1. The folding fingers 75 and 76 are mounted on arms 78 and 79 which can be rotated about the bearings on which they are carried by means of an adjusting screw which can be loosened or tightened. In this manner, and by adjusting the rotational position of the arms 78 and 79, the spacing between the pairs of fingers can be adjusted to accommodate boxes of different sizes. That is, as can be seen from FIG. 1, rotating the arm 79, for example, about the axis of shaft 65 in a clockwise direction will move the folding fingers apart; while counterclockwise rotation will move them together.

With reference, now, to FIGS. 1 and 9, a portion of the discharge apparatus of the box forming device is shown. Connected to the gear reducer 49 is a shaft 138 which carries a pair of sprockets 83. Engaged with the sprockets 83 are drive chains 84 having dogs 89 thereon for engaging formed boxes and removing them from their circular path of travel. The drive chains 84 pass around the sprockets 83, thence around the sprockets 92 (see also FIG. 1), then around small diameter sprockets 85 to the left of sprockets 92 and finally around large diameter sprockets 85 back to the sprockets 83 which are connected to the driving gear reducer. With this arrangement, it can be seen from FIG. 1 that the drive chains 84 follow the approximate path of a guide plate 86.

The sprockets 83 are driven at such a speed that the dogs 89 carried on chains 84 move at a greater rate of speed than the arms 13. Consequently, when the formed boxes reach the discharge zone and, specifically, a guide plate 86 (FIG. 1), a pair of dogs 89 on the chains 84 will engage the box and move it upwardly and then downwardly along the guide plate 86.

As shown in FIG. 9, the sprockets 83, 85 and 92 are mounted on two plates 93 and 94. The spacing between these plates may be adjusted by means of a handwheel 101 connected to a shaft 100 and carrying a sprocket 98. The sprocket 98, in turn, is connected through chain 99 to a cooperating sprocket 97 on shaft 95. The shafts 100 and 95 have threaded portions 102 received within cooperating threaded sleeves 103 carried on the two plates 93 and 94. Thus, upon rotation of the handwheel 101 in one direction, rotation of the shafts 100 and 95 will cause inward movement of the plates 93 and 94; whereas rotation in the opposite direction will cause the plates to move apart. As will be understood, this facilitates accommodation for various box sizes.

As the discharged box is moved upwardly and downwardly over the guide plate 86 it will eventually reach the lowermost right edge of the guide plate as shown in FIG. 1. This lowermost edge, as shown on the right-hand side of FIG. 9, is provided with a pair of slots 104 through which arms or dogs 105 are adapted to pass. The arms 105, in turn, are carried on chains 106 which rotate about sprockets carried on shaft 91 such that successive pairs of arms or dogs 105 move through the slots 104 to pick up discharged boxes to deposit them on belts 112 of the exit conveyor 113. The shaft 91 is provided with pulleys around which the belts 112 pass as well as the sprockets around which the chains 106 pass. The shaft 91 is driven by means of a chain connected to a sprocket 108. Sprocket 108, in turn, is driven by chain 107 (FIG. 1) which rotates around sprocket wheels 110 and 109. The sprocket wheel 109, in turn, is connected to the gear reducer 49 and, hence, the variable speed transmission 47. In this manner, the arms 105 pick up the boxes at the end of the guide plate 86 and deposit them on the conveyor belts 112 from whence they may be passed to a succeeding station for processing.

The box blanks 90 of FIG. 10 are stored in a guideway 115 (FIG. 1). From the guideway 115, they are passed in succession through feeding apparatus 114 and emerge from said apparatus individually and glued at the appropriate places. As they emerge from the apparatus 114, they are in an approximately horizontal plane which passes through the axis of the shaft 5. As viewed in FIG. 1, therefore, the box blanks move from apparatus 114 to the left until they engage a stop 117 which is adjustable on rails 116. The stock is now in the circular path of forming blocks 16. Thereupon, the forming block 16 which moves immediately from below seizes the stock 90, holds it firmly with the help of its suction cups 32 (FIG. 4) and presses it between roller 118 and folding guide 119 (FIG. 8) which are opposite each other in the path of travel of the forming block 16. The front and back wall portions E and F of the stock 90 (FIG. 10) will project beyond the edges of the forming block 16. Consequently, since the folding guide 119 and roller 118 are adjacent the edges of the forming block 16, the front and back portions E and F will be folded downwardly such that the box assumes the approximate configuration shown in FIG. 12. That is, the box is now folded along lines G and H. As the partially formed box moves along as viewed in FIG. 8, it will reach the folding fingers 74, 75, 76 and 77 which move into the path of the forming block and the box carried thereby, thereby engaging the triangular portions I at opposite ends of the box.

This is perhaps best shown in FIG. 12 where the direction of the movement of the box is indicated by the arrow K, while the direction of movement of folding fingers 76 and 77, for example, is indicated by the arrows L. As the box moves along between the folding fingers 76 and 77, they will engage the triangular portions I at the tops thereof, thereby causing these portions to fold along lines J and J', whereby the end panel D moves upwardly. Note in FIG. 8 that the folding fingers 74 and 77, for example, pass through slots or openings 120 in the folding guide 119. The other set of fingers 75 and 76 are, of course, above the folding guide 119. The speed of movement of the box along the direction of arrow K in FIG. 12 is greater than the speed of the folding fingers 76 and 77 in the same direction such that the box will move faster than the fingers 76 and 77 in the direction of movement of the box as the fingers rotate.

After passing by the folding fingers, the forming block 116 with the box thereon passes between a pair of parallel guides 121 mounted on the forming guide 119. As the box passes between the guides 121, the side panels C and D are pushed into engagement with the sides of the forming block. At the exit ends of the guides 121 are rollers 123 which are either provided with a flexible cover or are flexibly mounted. Since the rollers 123 project slightly into the cross-sectional area of the now-formed box, the box walls which tightly enclose forming block 16 are here pressed firmly against the forming block walling once again, and the glued box faces are pressed together. Before the end of the guides 121 is reached, portions M and N of the box cover A are bent to such an extent that the formed box, and also the cover A, can pass between the vertical rollers 123.

Referring again to FIG. 1, the heating zone follows the rollers 123 and is formed by two arcuate plates 127 (see also FIG. 9) which extend along both sides of the rotational path of the formed box. On the outside of the plates 127 are heating elements 128 (FIG. 1) which can produce a variable heating effect on the plates. In the cooling zone following the heating zone, the box is passed between plates 129, similar to plates 127, except that they are provided with cooling fins or else are provided with cooling jackets serving to receive a coolant for better heat transfer characteristics.

At the end of the cooling zone, guide plate 86 which is in the discharge zone is engaged. However, even before the beginning of guide plate 86, cam 43 (FIG. 5) has engaged follower 40 to disconnect the suction cups 32 from the boss 6 whereby the pressure on opposite sides of the suction cups is equalized. Simultaneously, cam 28 is engaged by follower 27 (FIG. 4) to draw forming block section 15 radially inwardly and against the inside forming block section 14. Thus, as the box reaches the uppermost portion of the guide plate 86, it will be engaged by dogs 89 on chains 84 (FIG. 9) and be readily forced over the crest of the guide plate 86 from whence it falls to the arms 104 of FIG. 9 where it is lifted onto the conveyor 113.

In order to facilitate the formation of boxes of other dimensions with the apparatus of the invention, the forming block sections 14 and 15 are mounted on their arm sections 17 or 18 so as to be detachable. Thus, the forming block sections whose dimensions determine the depth and width of the box can be replaced with other forming block sections which correspond to the desired box dimensions. The distance between the two forming block sections, which determines the width of the box, can also be adjusted by means of rod 24 shown in FIGS. 4 and 5.

The other parts of the forming apparatus and the distance between guides 121 which influence the box dimensions, as well as the spacing between plates 127 of the heating zone and plates 129 of the cooling zone can be adjusted in common by means of a handwheel 136 shown in FIG. 9. Thus, as viewed in FIG. 9, the handwheel 136 is provided with threaded portions which engage cooperating bushings 135 which carry the spaced plates 127. At the end of shaft 132 opposite handwheel 136 is a sprocket 133 which engages a chain 134. The chain 134, in turn, passes around a series of shafts 132 (FIG. 1), one of which is shown in FIG. 9, such that the spacing between the plates 127 or 130 can be adjusted simultaneously.

In order to prevent boxes from being damaged by heat during shutdowns which occur and which require a temporary shutdown of the device, means, not shown, are provided for moving the plates 127 away from the boxes when the arms 13 are not rotating.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. Apparatus for forming pre-glued folding box stock, comprising a forming block assembly mounted on the outer end of a radial arm rotatable about a central axis, said forming block assembly passing through a plurality of zones in its rotational path of travel around said central axis, the first of said zones including a pair of oppositely-disposed guides through which the forming block assembly passes whereby the side walls of box stock carried on the forming block assembly are pressed against the sides of the forming block assembly as it passes between the guides, a heating zone following the forming zone, a cooling zone following the heating zone, and a discharge zone where the formed box on the forming block assembly is discharged from said rotational path of travel, the discharge zone being between said cooling and forming zones, said apparatus further comprising suction cups carried on said forming block assembly for engaging the bottom portion of flat box stock as it passes through the forming, heating and cooling sections, and a vacuum pump connected to said suction cups, said apparatus further comprising valve means for connecting the suction cups to the vacuum pump as the forming block assembly passes through said forming, heating and cooling zones, the valve means serving to disconnect the suction cups from the vacuum pump when the forming block assembly passes through the discharge zone, said valve means being carried within said radial arm, spring means being provided for normally maintaining said valve means open, lever means being provided for closing said valve means, and a cam being provided in the area of said discharge zone for engaging said lever means to close said valve means against the force of said spring means.

2. Apparatus for forming pre-glued folding box stock, comprising a forming block assembly mounted on the outer end of a radial arm rotatable about a central axis, said forming block assembly passing through a plurality of zones in its rotational path of travel around said central axis, the first of said zones including a pair of oppositely-disposed guides through which the forming block assembly passes whereby the side walls of box stock carried on the forming block assembly are pressed against the sides of the forming block assembly as it passes between the guides, a heating zone following the forming zone, a cooling zone following the heating zone, and a discharge zone where the formed box on the forming block assembly is discharged from said rotational path of travel, the discharge zone being between said cooling and forming zones, said forming block assembly being comprised of two sections radially spaced with respect to each other, the outermost section being movable radially inwardly of said discharge zone to facilitate removal of a formed box therefrom, each radial arm comprising telescoping tubular members, the first of which is stationary and the second of which reciprocates within the first, with one of said forming block assembly sections being carried on the stationary tubular member and the other forming block section being carried on the reciprocable member, means being provided for resiliently holding said reciprocable tubular member in its radially outermost position, said means including an arm adjustable in length and having one end connected to the reciprocable tubular member, and a lever mechanism connected to the other end of said adjustable arm.

3. Apparatus according to claim 2 and including an arcuate cam in the area of said discharge zone for engaging said lever mechanism to force said reciprocable tubular member radially inwardly at said discharge zone.

4. Apparatus for forming pre-glued folding box stock, comprising a forming block assembly mounted on the outer end of a radial arm rotatable about a central axis, said forming block assembly passing through a plurality of zones in its rotational path of travel around said central axis, the first of said zones including a pair of oppositely-disposed guides through which the forming block assembly passes whereby the side walls of box stock carried on the forming block assembly are pressed against the sides of the forming block assembly as it passes between the guides, a heating zone following the forming zone, a cooling zone following the heating zone, and a discharge zone where the formed box on the forming block assembly is discharged from said rotational path of travel, the discharge zone being between said cooling and forming zones, said forming block assembly comprising two sections radially spaced with respect to each other, the outermost section being movable radially inwardly of said discharge zone to facilitate removal of a formed box therefrom, said apparatus further including an arcuate guide plate in the discharge zone and shaped such that it engages a formed box and moves it radially inwardly as the outermost section of the forming block assembly moves radially inwardly to facilitate removal of the formed box from the forming block assembly, the guide plate having a generally inverted V-shaped configuration such that as the formed box reaches the crest of the V-shaped configuration it will move downwardly and out of the rotational path of travel of said forming block assembly.

5. Apparatus according to claim 4 and including chains extending along both sides of the forming block assemblies above said guide plate and following a path of travel which extends along the surface of the guide plate, the speed of the chains being greater than the tangential speed of the forming block assemblies, and dogs carried on the chains which engage formed boxes as they are discharged from the forming block assemblies and direct the formed boxes over said guide plate.

6. Apparatus according to claim 5 and including means for adjusting the spacing between said chains to thereby accommodate boxes of different sizes.

7. Apparatus according to claim 4 and including an exit conveyor at the discharge end of said guide plate for conveying formed boxes to a point remote from the forming apparatus.

References Cited
UNITED STATES PATENTS

| | | | |
|---|---|---|---|
| 1,220,517 | 3/1917 | Kondolf. | |
| 2,077,913 | 4/1937 | Waters | 93—44.1 |
| 2,671,383 | 3/1954 | Jungmayr. | |
| 3,196,760 | 7/1965 | Terry | 93—44.1 |
| 3,216,175 | 11/1965 | Stohlquist | 93—53 X |
| 3,303,761 | 2/1967 | Monroe | 93—44.1 |
| 3,364,826 | 1/1968 | Austin | 93—44.1 |

WAYNE A. MORSE, Jr., Primary Examiner

U.S. Cl. X.R.

93—59